United States Patent
Lyle et al.

(10) Patent No.: US 9,442,599 B2
(45) Date of Patent: Sep. 13, 2016

(54) SYSTEM AND METHOD FOR USING SIGNALS RESULTING FROM SIGNAL TRANSMISSION IN A TOUCH SENSOR

(71) Applicants: James D. Lyle, Santa Clara, CA (US); Esat Yilmaz, Santa Cruz, CA (US)

(72) Inventors: James D. Lyle, Santa Clara, CA (US); Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 113 days.

(21) Appl. No.: 13/950,893

(22) Filed: Jul. 25, 2013

(65) Prior Publication Data
US 2015/0029159 A1   Jan. 29, 2015

(51) Int. Cl.
G06F 3/041   (2006.01)
G06F 3/044   (2006.01)

(52) U.S. Cl.
CPC ............. *G06F 3/0418* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 6,297,811 B1 * | 10/2001 | Kent | ........................ | G06F 3/044 178/18.01 |
| 7,167,019 B2 * | 1/2007 | Broyde | ..................... | H04B 3/32 326/26 |
| 7,545,289 B2 * | 6/2009 | Mackey et al. | ................. | 341/20 |
| 7,567,690 B2 * | 7/2009 | Foundeur | ........... | G06K 9/00013 340/5.52 |
| 7,663,607 B2 | 2/2010 | Hotelling | | |
| 7,875,814 B2 | 1/2011 | Chen | | |
| 7,920,129 B2 | 4/2011 | Hotelling | | |
| 8,031,094 B2 | 10/2011 | Hotelling | | |
| 8,031,174 B2 | 10/2011 | Hamblin | | |
| 8,040,326 B2 | 10/2011 | Hotelling | | |
| 8,049,732 B2 | 11/2011 | Hotelling | | |
| 8,179,381 B2 * | 5/2012 | Frey et al. | ..................... | 345/174 |
| 8,830,180 B2 * | 9/2014 | Yilmaz | ................ | G01D 5/2405 345/173 |
| 2009/0315854 A1 | 12/2009 | Matsuo | | |
| 2010/0045632 A1 * | 2/2010 | Yilmaz et al. | ................. | 345/174 |
| 2011/0050624 A1 * | 3/2011 | Lee | ........................ | G06F 3/045 345/174 |
| 2011/0085122 A1 * | 4/2011 | Fu | ........................ | G02F 1/13338 349/149 |

(Continued)

FOREIGN PATENT DOCUMENTS

WO   WO 2012/129247   9/2012

OTHER PUBLICATIONS

U.S. Appl. No. 61/454,936, filed Mar. 21, 2011, Myers.

(Continued)

*Primary Examiner* — Dismery Mercedes
(74) *Attorney, Agent, or Firm* — Baker Botts L.L.P.

(57) ABSTRACT

In an embodiment, a system includes a controller coupled to a first set of electrodes. The first set of electrodes are substantially arranged along a first axis. The controller is configured to send a first set of signals through a transmission medium to a first set of electrodes and receive a second set of signals. The impedance of the transmission medium is different than the impedance of the first set of electrodes. The second set of signals include characteristics resulting from effects on the first set of signals from the first set of electrodes and the transmission medium. The controller is configured to change, in response to analyzing the second set of signals, one or more of the following: an impedance of the controller and a voltage associated with the controller.

20 Claims, 4 Drawing Sheets

(56) References Cited

U.S. PATENT DOCUMENTS

| | | | |
|---|---|---|---|
| 2011/0128257 A1* | 6/2011 | Kim | G06F 3/041 345/175 |
| 2011/0175626 A1* | 7/2011 | Lee | G06F 1/3203 324/629 |
| 2011/0210934 A1* | 9/2011 | Lee | G06F 3/044 345/173 |
| 2011/0267287 A1* | 11/2011 | Bartling | G06F 3/041 345/173 |
| 2012/0019478 A1* | 1/2012 | Bulea | G06F 3/0416 345/174 |
| 2012/0026123 A1* | 2/2012 | Grunthaner | G06F 3/0418 345/174 |
| 2012/0076612 A1 | 3/2012 | Bryan | |
| 2012/0086668 A1* | 4/2012 | Wang et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0325639 A1* | 12/2012 | Scuderi et al. | 200/600 |
| 2013/0063323 A1* | 3/2013 | Mankaruse | H01Q 1/243 343/174 |
| 2013/0106764 A1* | 5/2013 | Sundara-Rajan | G06F 3/03545 345/174 |
| 2013/0249855 A1* | 9/2013 | Zhang | G06F 3/0416 345/174 |
| 2013/0249862 A1* | 9/2013 | Xu | H02J 3/00 345/174 |
| 2013/0314626 A1* | 11/2013 | Misaki | G06F 3/044 349/12 |
| 2014/0176498 A1* | 6/2014 | Yanase | G06F 3/044 345/174 |
| 2014/0306923 A1* | 10/2014 | Brillant et al. | 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

\* cited by examiner

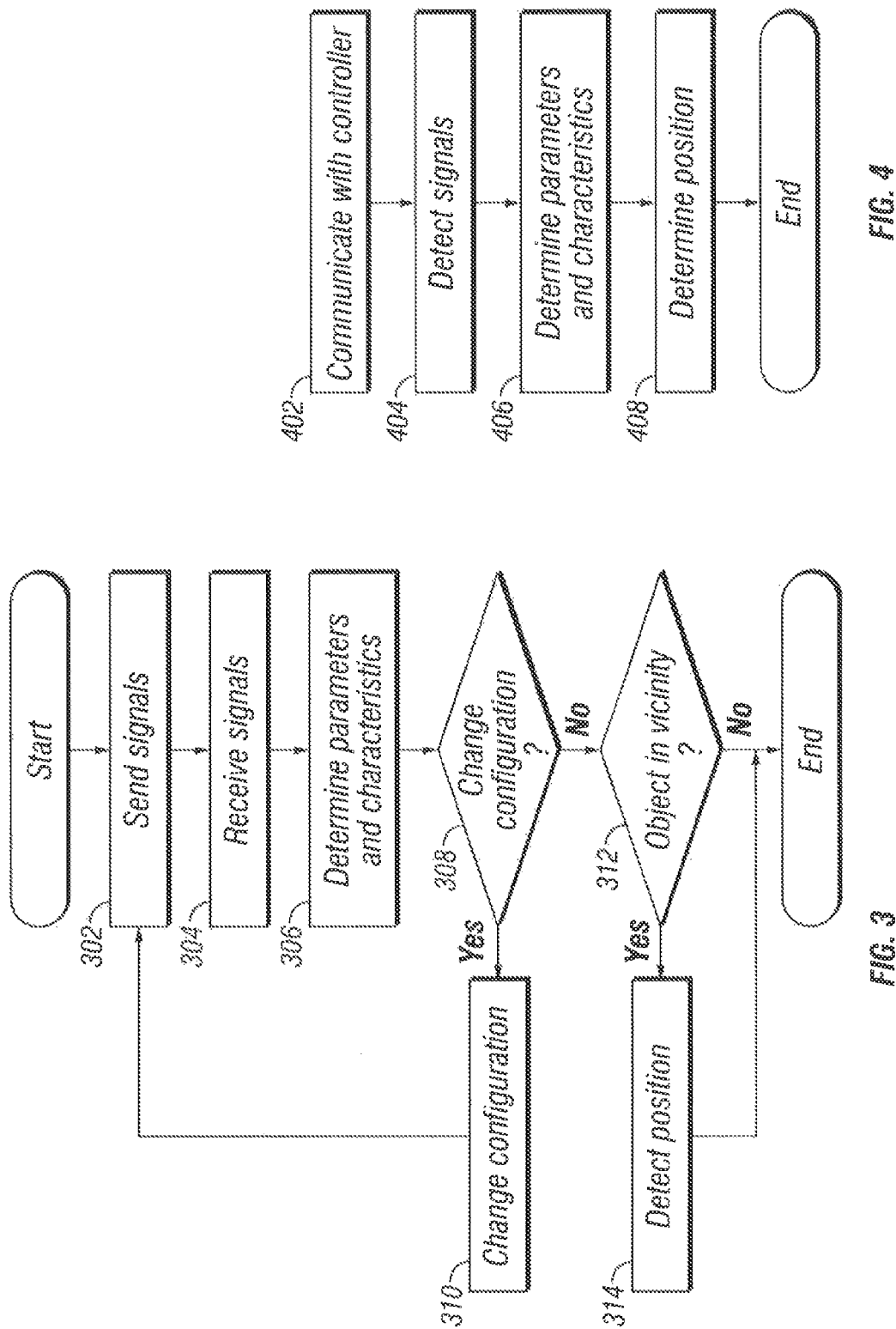

SYSTEM AND METHOD FOR USING SIGNALS RESULTING FROM SIGNAL TRANSMISSION IN A TOUCH SENSOR

TECHNICAL FIELD

This disclosure relates generally to touch screen devices and more particularly to a system and method for using signals resulting from signal transmission in a touch sensor.

BACKGROUND

A touch sensor may detect the presence and location of a touch on, or the presence of an object (such as a user's finger or a stylus) within a vicinity of, a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within a vicinity of the surface of the capacitive touch screen, a change in capacitance may occur within the touch screen at the location of the touch or vicinity. A touch-sensor controller may process the change in capacitance to determine its position on the touch screen.

BRIEF DESCRIPTION OF THE DRAWINGS

FIG. 3 illustrates an example of a method of operation of the touch-sensor controller of FIG. 1.

FIG. 4 illustrates an example of a method of detecting a position by an object in the vicinity of a touch sensor.

DESCRIPTION OF EXAMPLE EMBODIMENTS

Figure 1:
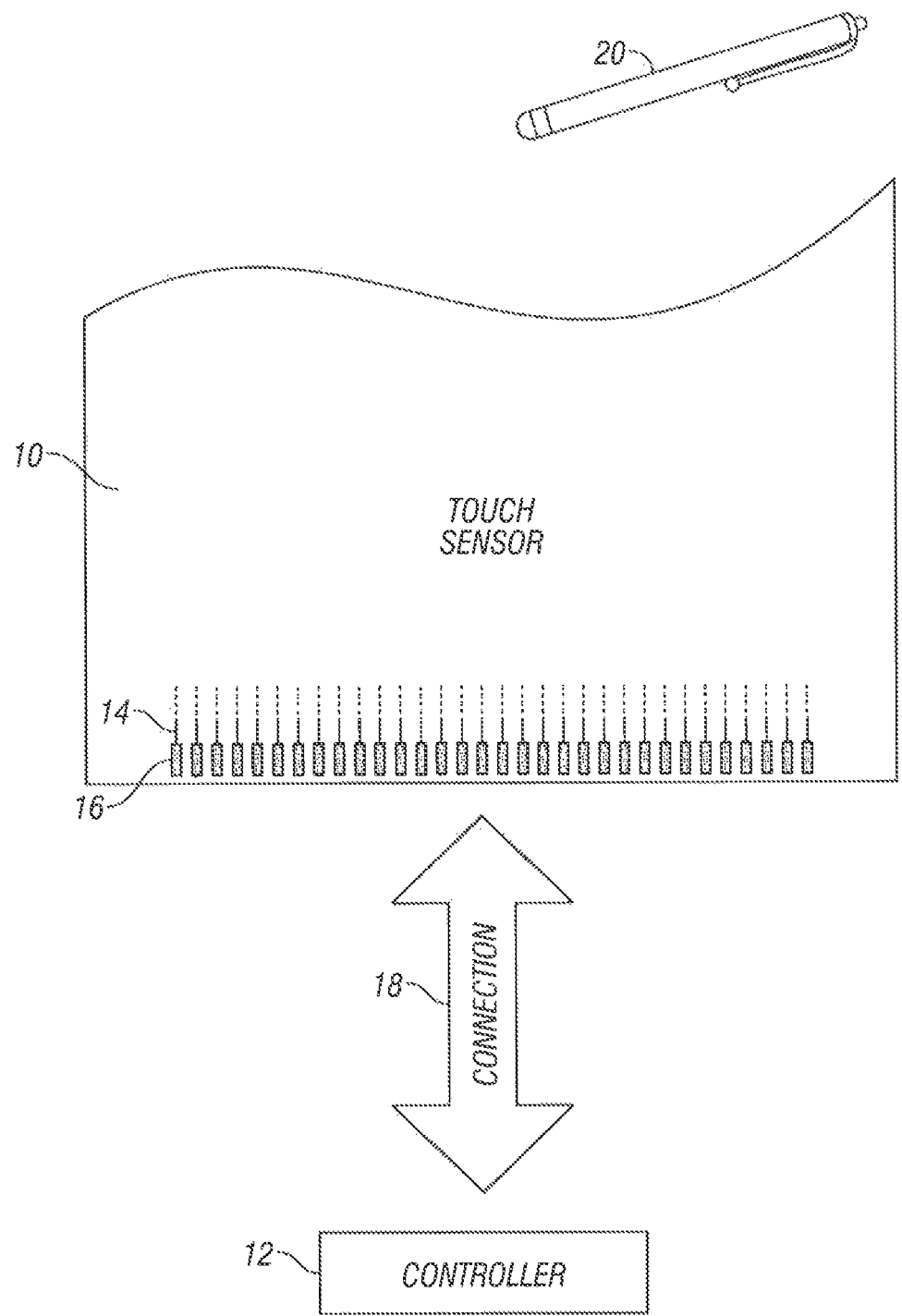
FIG. 1 is a schematic diagram that illustrates an example of a touch sensor and an example of a touch-sensor controller.

FIG. 1 is a schematic diagram that illustrates one embodiment of a system for detecting touches including touch sensor 10, touch-sensor controller 12, and object 20. Object 20 is in the vicinity of touch sensor 10. Touch sensor 10 and touch-sensor controller 12 may detect the presence and location of a touch of object 20 on, or the presence or location of object 20 in a vicinity of, a touch-sensitive area of touch sensor 10. In some embodiments, touch-sensor controller 12 is configured to perform such detection using effects of transmitting signals from touch-sensor controller 12 to touch sensor 10. As an example, such effects may be a result of impedance differences in aspects of touch-sensor controller 12 and in aspects of touch sensor 10.

In some embodiments, touch sensor 10, touch-sensor controller 12, and connection 18 are included in a device. As examples, such a device may be and/or include any suitable combination of: a mobile phone, a personal digital assistant, a media player, a tablet computing device, a laptop computer, a computer, a touch screen interface, a touch interface, a keypad, a keyboard, a trackpad, a mouse, a touch screen, a display, a camera, and any other suitable device. As examples, object 20 being in a vicinity of touch sensor 10 may include object 20: approaching touch sensor 10, hovering over touch sensor 10, moving over touch sensor 10 (e.g. performing a gesture over touch sensor 10), and contacting a device including touch sensor 10. In certain embodiments, a vicinity of touch sensor 10 includes a portion or all of a distance within which object 20 may measurably affect capacitances of electrodes of touch sensor 10. For example, object 20 present above or approaching touch sensor 10 may be considered in a vicinity of touch sensor 10 at certain distances. In certain embodiments, object 20 may be in a vicinity of touch sensor 10 when it contacts a device including touch sensor 10 or when it does not contact such a device. Examples of object 20 include one or more fingers, a passive stylus, an active stylus, and other suitable objects whose presence can have a capacitive relationship with touch sensor 10.

Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of electrodes disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

In some embodiments, as object 20 enters a vicinity of touch sensor 10, capacitive coupling between object 20 and touch sensor 10 is increased or decreased and more or less charge is transferred through touch sensor 10 as a result of touch-sensor controller 12 sending drive signals. Changes in the amount of charge transferred through touch sensor 10 may be used to detect the presence of object 20 in a vicinity of touch sensor 10 and/or movement of object 20 towards or away from touch sensor 10.

In some embodiments, touch-sensor controller 12 may implement a form of touch sensing based on sensing signal reflections. Touch sensor 10 may include electrodes forming one or more lines. A signal (e.g. a pulse or a periodic signal) may be applied to an electrode line of touch sensor 10 (e.g. by touch-sensor controller 12), and a reflection of the signal applied to the line may be caused by an external influence (such as a touch of object 20 or the presence of object 20 in a vicinity of touch sensor 10). When object 20 touches or comes within a vicinity of the line, a change in impedance may occur at or near a location of the line where the touch or the approach of object 20 occurred.

In particular embodiments, one or more electrodes may together form a line running horizontally or vertically or in any suitable orientation. In particular embodiments, one or more electrodes may run substantially perpendicular to other electrodes. A line may have a serpentine shape or may be configured as a space-filling curve. Herein, a line may encompass one or more electrodes making up the line, and vice versa, where appropriate.

Touch sensor 10 may have electrodes disposed in a pattern on one side of a single substrate. In addition or as an alternative, touch sensor 10 may have electrodes disposed in a pattern on another side of a substrate. Although this disclosure describes particular configurations of particular electrodes forming particular lines, this disclosure contemplates any suitable configuration of any suitable electrodes disposed on any suitable number of any suitable substrates in any suitable patterns.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the electrodes of touch sensor 10. The sense unit may sense signal reflections from the electrodes of touch sensor 10 and provide measurement signals to the processor unit representing signal reflections. The processor unit may control the supply of drive signals to the electrodes by the drive unit and process measurement signals from the sense unit to detect and process the presence and location of a touch input within the touch-sensitive area(s) of touch sensor 10 or input based on the presence of an object in a vicinity of touch sensor 10. The processor unit may also track changes in the position of a touch input within the touch-sensitive area(s) of touch sensor 10 or in the presence of an object in a vicinity of touch sensor 10. The storage unit may store programming for execution by the processor unit, including programming for controlling the drive unit to supply drive signals to electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide connections for coupling touch-sensor controller 12 to electrodes of touch sensor 10, through which the drive unit of touch-sensor controller 12 may supply drive signals to the electrodes. Tracks 14 may provide connections for coupling touch-sensor controller 12 to electrodes of touch sensor 10, through which the sense unit of touch-sensor controller 12 may sense signals from the electrodes of touch sensor 10. In some embodiments, a subset of tracks 14 are arranged such that they have substantially the same length while another subset of tracks 14 are arranged such that they have substantially different lengths. For example, the subset of tracks 14 that couple touch-sensor controller 12 to electrodes of touch sensor 10 that are supplied with drive signals have substantially the same length while the subset of tracks 14 that couple touch-sensor controller 12 to electrodes of touch sensor 10 that are coupled to the sense unit of touch-sensor controller 12 have substantially different lengths. In some embodiments, one of tracks 14 may be configured such that it is used both to transmit drive signals from touch-sensor controller 12 to certain electrodes of touch sensor 10 and to transmit signals from electrodes of touch sensor 10 to the sense unit of touch-sensor controller 12.

Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10. In some embodiments, touch sensor 10 may be configured to include pattern resistors, capacitors, or inductors (e.g. formed using FLM or other suitable material used in touch sensor 10) such that any of the interfaces (e.g. connection pads 16) between touch-sensor controller 12 and touch sensor 10 are impedance matched. For example, the pattern resistors, capacitors, or inductors may be configured to simulate impedance matching provided by Bayonet Neill-Concelman (BNC) connectors (e.g. 50, 75, or 100 ohm connectors).

In some embodiments, aspects of the system depicted in FIG. 1 may be configured to have related impedances. For example, each track 14 may be coupled to a corresponding line of electrodes of touch sensor 10. Each track 14 may have an impedance that is smaller than its corresponding line of electrodes. The ratio of impedances of a track 14 and its corresponding line of electrodes may be the same or different than the ratio of impedances of other tracks 14 and their corresponding line of electrodes. As an example, a line of electrodes may have an impedance 1.5 times to 2 times greater than its corresponding track 14. In some embodiments, the ratio of impedances between a set of lines of electrodes of touch sensor 10 and their corresponding tracks 14 may be different (smaller or larger) than another set of lines of electrodes of touch sensor 10 and their corresponding tracks 14. As an example, touch sensor 10 can be configured such that more charge is delivered to a first line of electrodes than a second line of electrodes because, at least in part, the ratio of impedances of the first line of electrodes to its corresponding track 14 is smaller than the ratio of impedances of the second line of electrodes to its corresponding track 14. This may, in various embodiments, allow for aspects of touch sensor 10 to be more sensitive to a touch than other aspects. For example, an edge or a corner of a touch screen including touch sensor 10 can be configured to be more sensitive to a touch than other parts of the touch screen by having a larger ratio the impedances of lines of electrodes associated with the edge or corner of the touch screen to the impedances of corresponding tracks 14 than the ratio of impedances of other lines of electrodes to their corresponding tracks 14.

Particular embodiments may use one or more suitable components, elements, functions, operations, or steps illustrated by or described above with respect to FIG. 1 to implement one or more suitable components, elements, functions, operations, or steps illustrated by or described below with respect to FIGS. 2A-4, where appropriate.

Figure 2A:
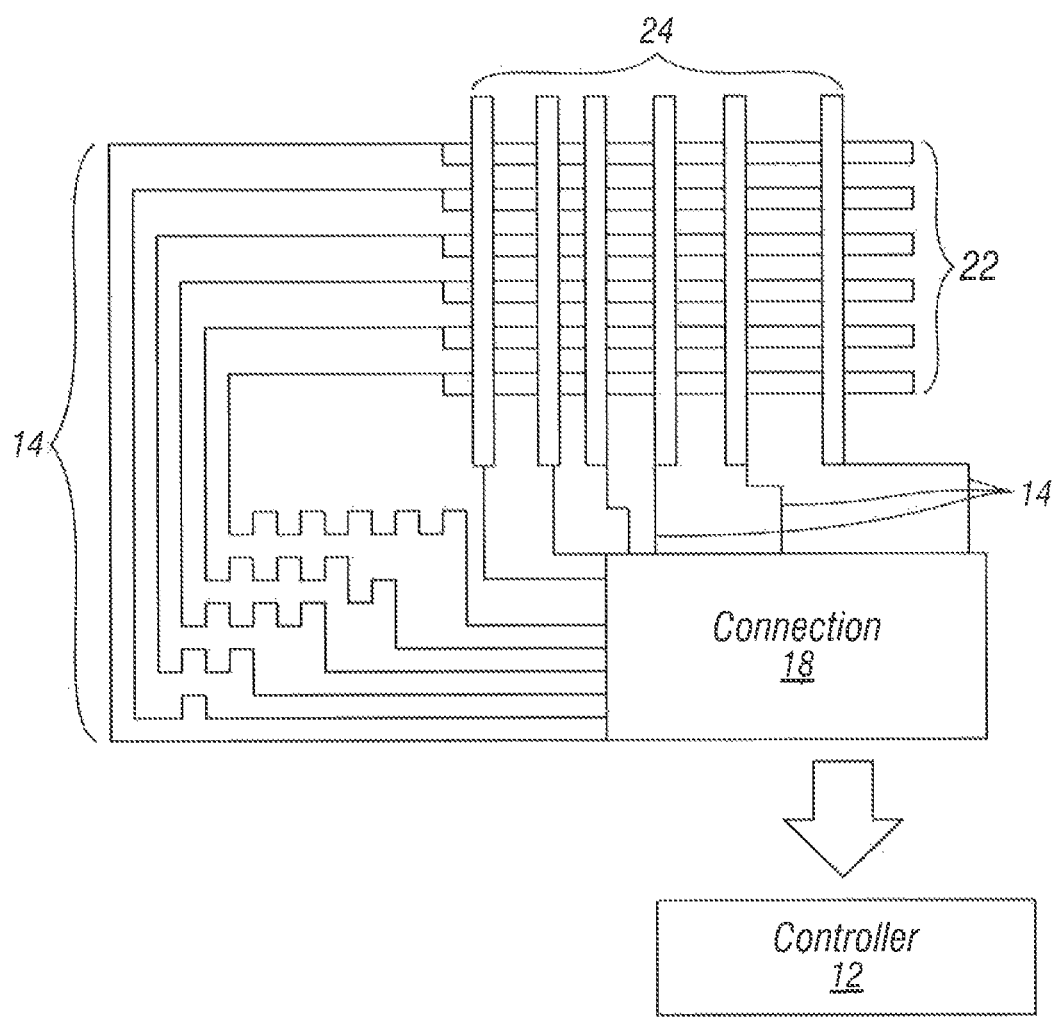
FIG. 2A illustrates one embodiment of the system of FIG. 1 illustrating two sets of electrodes.

FIG. 2A illustrates one embodiment of the system depicted in FIG. 1. Electrodes 22 and 24 of touch sensor 10 are depicted. Electrodes 22 are arranged along a first axis and electrodes 24 are arranged along a second axis. Touch-sensor controller 12 is coupled to electrodes 22 and 24 through tracks 14 and connection 18. The embodiment depicted in FIG. 2A illustrates that tracks 14 coupled to electrodes 22 are of substantially the same length while tracks 14 coupled to electrodes 24 have substantially different lengths. In various embodiments, though, other suitable arrangements are possible such as: two or more of tracks 14 coupled to electrodes 22 may have substantially the same length, two or more of tracks 14 coupled to both electrodes 22 and 24 may have substantially the same length, and a portion of tracks 14 coupled to electrodes 22 may have substantially the same length while another portion of tracks 14 coupled to electrodes 22 may have substantially different lengths. Electrodes 22 may be coupled to touch-sensor controller 12 such that electrodes 22 receive drive signals and touch-sensor controller 12 may be coupled to electrodes 24 to receive sense signals.

Figure 2B:
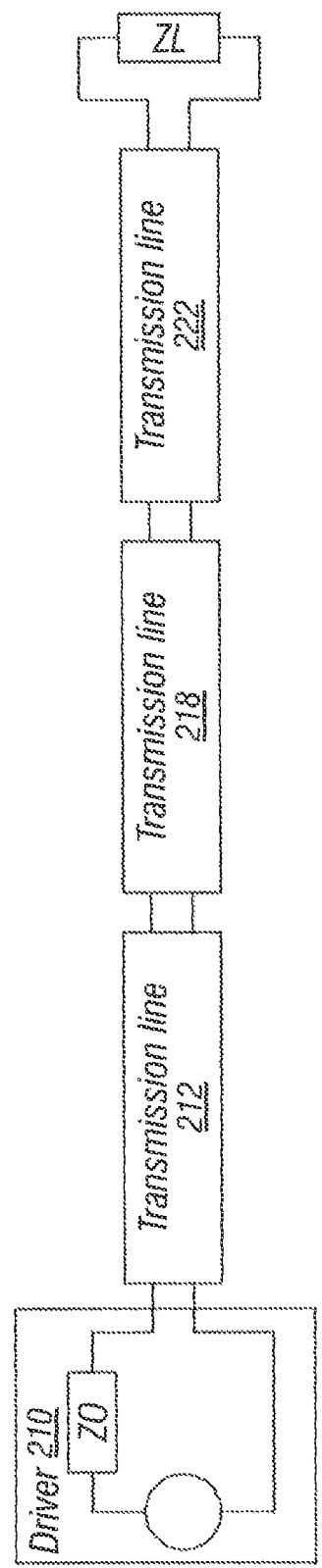
FIG. 2B is a simplified circuit model of one embodiment of the system illustrated in FIG. 2A.

FIG. 2B is a simplified circuit model of one embodiment of the system illustrated in FIG. 2A illustrating the transmission media through which signals sent from touch-sensor controller 12 travel to one of electrodes 22. For example, a signal may originate from driver 210 that has an impedance Z0. The signal may then travel through a circuit board of controller 12 (illustrated as transmission line 212) to connection 18. The signal may then travel through connection 18 (illustrated as transmission line 218) to tracks 14. As an example, transmission line 218 may include the signal traveling through a flexible printed circuit. The signal may then travel to one of electrodes 22 (e.g., a line of electrodes in the x-axis) through one of tracks 14 (collectively illustrated as transmission line 222) and terminate at a load (illustrated as impedance ZL). In some embodiments, the model of FIG. 2B may be modified to include more detail. For example, transmission line 222 may include sub-regions that may each be their own transmission line; examples of such sub-regions include one of tracks 14 and one of electrodes 22.

In some embodiments, the behavior of transmission lines 212, 218, and 222 may be based, at least in part, on their respective lengths (in terms of the speed of light) relative to the rise and fall times of signals traveling through transmission lines 212, 218, and 222. As examples, such behavior may be similar to lumped circuits (e.g., a model that uses idealized electrical components and idealized conducting wires) or distributed circuits (e.g., components are connected by wires that have impedance). In some embodiments, the design of components such as touch-sensor controller 12, connection 18, tracks 14, and touch sensor 10 may be configured so that transmission lines 212, 218, and 222 can have desired behavior (e.g., operating as a lumped circuit or a distributed circuit). For example, components of FIG. 1 can be configured so that transmission lines 212 and 218 have short lengths while transmission line 222 has a long length. In this example, transmission lines 212 and 218 will behave as a lumped circuit and transmission line 222 will behave as a distributed circuit; this would allow for effects associated with a distributed circuit to be contained in touch sensor 10. As another example, components of FIG. 1 can be configured so that transmission lines 212 and 218 have long lengths while transmission line 222 has a short length. In this example, transmission lines 212 and 218 will behave as distributed circuits and transmission line 222 will behave as a lumped circuit; this would allow for effects associated with a distributed circuit to be reduced in touch sensor 10. In some embodiments, characteristics of the signals used in the system of FIG. 2B can affect the type of behavior exhibited by transmission lines 212, 218, and 222. For example, a signal with fast transition times will cause transmission lines 212, 218, and 222 to tend towards behavior of distributed circuits while slow transition times will cause transmission lines 212, 218, and 222 to tend towards behavior of lumped circuits. Touch-sensor controller 12 can be used to obtain desired behavior from transmission lines 212, 218, and 222 by varying signal characteristics. For example, should behavior that more closely resembles lumped circuits be desired, touch-sensor controller 12 can use signals with a slower edge rate; touch-sensor controller 12 can change and use signals with a higher edge rate should behavior that more closely resembles a distributed circuit be desired.

In some embodiments, the impedances present in the circuit model of FIG. 2B can affect signals transmitted through transmission lines 212, 218, and 222. These effects may be measured by touch-sensor controller 12. Examples of such effects include reflections, ringing, and stair-step waveforms. In some embodiments, touch-sensor controller 12 can change aspects such as the type of signals used and its impedance to exercise degrees of control over effects caused by transmission lines 212, 218, and 222. For example, charge time for touch sensor 10 may be reduced by causing more current (and/or charge) to be sent to touch sensor 10 even though object 20 may not be present in the vicinity of the first set of electrodes. In some embodiments, causing more current to be sent to touch sensor 10 may also improve signal-to-noise ratios. As another example, a higher voltage than what was driven by touch-sensor controller 12 can be present in touch sensor 10. This can also reduce the charge time for touch sensor 10 as well as improve signal-to-noise ratios.

In some embodiments, portions of touch sensor 10 can receive signals with different characteristics that result from the same source signal sent by touch-sensor controller 12. This can be a result of the impedances in the system of FIG. 1 as illustrated in FIG. 2B. For example, one portion of touch sensor 10 may be made more sensitive than another. This may be based on the materials and layout of the components illustrated in FIG. 1. This can also result from the impedance used by touch-sensor controller 12 being varied. The higher sensitivity may be accomplished, e.g., by causing more charge to be present in that portion of touch sensor 10. As examples, this may be beneficial as it can tune portions of touch sensor 10 to certain kinds of touches or gestures or because it can work around a defect in touch sensor 10. Defects may arise over time or at manufacturing. Observing the effects on signals sent by touch-sensor controller 12 can reveal where (e.g., at transmission line 212, 218, or 222) a defect is located. Defects can include shorts or open portions of a circuit.

For example, touch-sensor controller 12 may drive a line of the x-axis of touch sensor 10 with a fast-edge rate signal. Touch-sensor controller 12 may analyze the signals received on lines of the y-axis and analyze reflection received from the line of the x-axis that was driven. Characteristics of these analyzed signals result in information about any defects of circuits in the system and the timing characteristics can allow for the determination of the position of such defects in the circuits. As an example, touch-sensor controller 12 can change its impedance or voltages associated with touch-sensor controller 12 (e.g., the voltage of drive signals sent by touch-sensor controller 12) in order to reduce the impact of defects in the circuits. In some embodiments, touch-sensor controller 12 is configured to send a signal that has a non-linear edge rate because the signal may be matched to the defects or characteristics of touch sensor 10. This can be advantageous in that the system can have better performance than if other types of signals were used.

In some embodiments, techniques other than varying the drive signal sent from touch-sensor controller 12 can be used to manage effects of transmission lines 212, 218, or 222. For example, series termination techniques can be used, this can involve adding resistors or other elements to driving circuitry of touch-sensor controller 12. Non-linear forms of termination can be used as well. For example, the impedance of connection 18 (which can be implemented using a flex connector) can be configured to be different than the impedance of touch sensor 10. In some embodiments, electrodes of touch sensor 10 can be implemented using patterns (e.g., patterns that implement capacitors, resistors, and/or inductors) and this may appear as a reactive load to the driver of touch-sensor controller 12. This can cause effects similar to the effects of transmission lines 212, 218, and 222 discussed above. Touch-sensor controller 12 can be configured to send signals that take advantage of such effects in a manner similar to the techniques discussed above and elsewhere in this disclosure. For example, touch-sensor controller 12 can send signals that will cause higher voltages or current in certain portions of touch sensor 10.

In some embodiments, analyzing reflections received from driven lines of touch sensor 10 may allow for determining a two-dimensional position of a touch on touch sensor 10 without having two sets of lines in two axes. For example, the system depicted in FIG. 2A may be capable of detecting a two-dimensional position of a touch on touch sensor 10 without electrodes 24. The touch on touch sensor 10 can affect the impedance of touch sensor 10. Touch-sensor controller 12 may analyze the reflections received on the driven lines of the x-axis. Characteristics of these reflections result in determining which of the lines of the x-axis have been affected by the touch. The timing characteristics can allow for the determination of the position along the y-axis of the touch. This can provide one or more advantages in various embodiments. For example, truly single-sided designs can be used in touch sensor 10. As another example, multiple lines can be driven simultaneously and this may result in higher report rates for the system. As another example, routing within touch sensor 10 may be simplified. In various embodiments, one or more of the following advantages may be present: facilitating large capacitive touchscreens (e.g., over four feet), high frequency touchscreens, and increased effectiveness of passive stylus applications.

In some embodiments, effects of transmission lines 212, 218, or 222 can be used to communicate information to object 20. For example, one of transmission lines 212, 218, or 222 may cause ringing from a drive signal sent by touch-sensor controller 12. This can behave like a tuned-circuit whose resonant frequency depends on the physical parameters of touch-sensor controller 12 and touch sensor 10 (e.g., these components can be manufactured to have the parameters that lead to the desired ringing behavior). This can be used to enhance or suppress certain frequencies in touch sensor 10. As another example, specific harmonics of a drive signal sent by touch-sensor controller 12 can be used to send information to or receive information from object 20 (e.g., when object 20 is implemented using a reactive stylus). The ringing behavior causes higher frequencies which may be easier to detect by object 20 even though touch-sensor controller 12 is driving a signal with lower frequencies.

FIGS. 3 and 4 illustrate examples of methods for detecting the presence of an object in a vicinity of a device. The steps discussed below regarding FIGS. 3 and 4 may be used in the systems described above with respect to FIGS. 1-2B. The discussion of the steps of FIGS. 3 and 4 below will reference components of FIGS. 1-2B but other suitable components of this disclosure may perform the steps of FIGS. 3 and 4. Some embodiments may repeat or omit certain steps of the methods of FIGS. 3 and 4 as well as add steps to the methods of FIGS. 3 and 4, where appropriate. Moreover, although this disclosure describes and illustrates particular steps of the methods of FIGS. 3 and 4 as occurring in a particular order, this disclosure contemplates any suitable steps of the methods of FIGS. 3 and 4 occurring in any suitable order including performing any suitable steps simultaneously. Furthermore, although this disclosure describes and illustrates particular components, devices, or systems carrying out particular steps of the methods of FIGS. 3 and 4, this disclosure contemplates any suitable combination of any suitable components, devices, or systems carrying out any suitable steps of any of the methods of FIGS. 3 and 4.

Referring to FIG. 3, at step 302, in some embodiments, touch-sensor controller 12 sends a drive signal to one or more electrode lines of touch sensor 10. At step 304, one or more sets of signals are received at touch-sensor controller 12 from touch sensor 10. For example, one set of signals may be received on the driven line and another set of signals may be received from another electrode line of touch sensor 10 that is capacitively coupled to the driven line. In some embodiments, only signals from the driven line are received at step 304.

At step 306, in some embodiments, the signals sent at step 302 and received at step 304 are analyzed to determine one or more timing parameters and/or characteristics of the signals. The characteristics determined at this step may include effects of one or more transmission media through which the drive signal was sent at step 302. Examples of such effects include reflections, ringing, and stair-step waveforms. As another example, characteristics of signals received from electrode lines of touch sensor 10 that are capacitively coupled to the line driven at step 302 including the amplitude, frequency, and/or phase of these signals. Other suitable characteristics may be determined at this step. In some embodiments, timing parameters determined at this step can include one or more of the amount of time elapsed between sending the drive signal at step 302 and receiving the signals at step 304 and when characteristics of a signal received at step 304 occur in the waveform of the signal.

At step 308, in some embodiments, a determination is made as to whether the configuration of touch-sensor controller 12 should be modified based on the determinations of step 306. Examples of modifications of touch-sensor controller 12 include modifying the impedance of touch-sensor controller 12 (e.g., to a linear or non-linear impedance), modifying the impedance of components of touch-sensor controller 12, and modifying the drive signal used by touch-sensor controller 12 (e.g., varying the voltage of the drive signal). For example, the determinations of step 306 may indicate that there is a short in touch sensor 10. In this example, it may be determined that modifications to the configuration of touch-sensor controller 12 may aid in ameliorating the short in touch sensor 10. If it is determined that the configuration of touch-sensor controller 12 should be performed, then it is performed at step 310 and the method may return to step 302. If it is determined not to modify the configuration of touch-sensor controller 12, then step 312 is performed. In some embodiments, step 308 is not performed and the method may proceed from step 306 to step 312. For example, touch-sensor controller 12 may already be appropriately configured for touch sensor 10 based on previous testing.

At step 312, in some embodiments, it is determined whether object 20 is in a vicinity of touch sensor 10. As an example, one or more thresholds may be applied to the set of signals received at step 304 from electrode lines capacitively coupled to the line driven at step 302 to determine if object 20 is in a vicinity of touch sensor 10. Other suitable techniques may be performed. In some embodiments, signals received from the line(s) driven at step 302 may be analyzed to detect whether object 20 is in a vicinity of touch sensor 10. For example, the presence of object 20 in a vicinity of touch sensor 10 may affect the impedance of touch sensor 10. This impact may be determined by analyzing the signals received from the driven (line(s) (e.g., reflections, ringing, or stair-step waveforms). If it is determined that object 20 is in a vicinity of touch sensor 10, step 314 may be performed; otherwise, the method may end or return to step 302.

At step 314, in some embodiments, a position on touch sensor 10 may be determined corresponding to determining that object 20 is in the vicinity of touch sensor 10. Object 20 may be in a vicinity of touch sensor 10 but may not be physically contacting the device comprising touch sensor 10. The present disclosure contemplates using any suitable technique for determining a position on touch sensor 10 corresponding to the detected object 20. For example, larger values of the set of signals may be identified and electrodes corresponding to the identified larger values may be examined. Coordinates (e.g., one-dimensional or two-dimensional coordinates) may be determined by examining the position of the electrodes within touch sensor 10. For example, timing information related to when drive signals were sent to touch sensor 10 may be correlated with the signals received at step 304 to determine the position. Further, as discussed above with respect to FIGS. 2A and 2B, signals received on line(s) driven at step 302 may be used to determine position. For example, touch-sensor controller 12 may analyze the reflections received on the driven lines of the x-axis. Characteristics of these reflections result in determining which of the lines of the x-axis have been affected by the touch. The timing characteristics can allow for the determination of the position along the y-axis of the touch. In some embodiments, a combination of analyzing signals from driven lines and lines capacitively coupled to driven lines may be used to determine position. This may be advantageous in that the determination of position information may be performed faster and/or more accurately. After step 314 is performed, the method may end or repeat.

FIG. 4 illustrates steps for a method of detecting position by object 20. For example, object 20 may be a stylus that is configured to communicate (wired or wirelessly) with touch-sensor controller 12. At step 402, in some embodiments, object 20 communicates with touch-sensor controller 12. This communication may involve object 20 sending information to touch-sensor controller 12 regarding its status and receiving information from touch-sensor controller 12. Information received by object 20 from touch-sensor controller 12 may include information about drive signals sent to touch sensor 10, characteristics of signals received from touch sensor 10, and timing information regarding signals sent to and received from touch sensor 10.

At step 404, in some embodiments, object 20 detects signals from touch sensor 10. This is performed by capacitively coupling between object 20 and touch sensor 10. For example, object 20 may observe drive signal(s) sent to electrode lines of touch sensor 10. As another example, object 20 may observe effects of transmission media on drive signal(s) sent to lines of touch sensor 10.

At step 406, in some embodiments, characteristics and timing parameters are determined by object 20 regarding the information detected at step 404. The characteristics determined at this step may include effects of one or more transmission media through which drive signals were sent by touch-sensor controller 12. Examples of such effects include reflections, ringing, and stair-step waveforms. Other suitable characteristics may be determined at this step. In some embodiments, timing parameters determined at this step can include one or more when drive signals were sent by touch-sensor controller 12 and when characteristics of a signal received at step 404 occur in the waveform of the signal. The details and techniques discussed above with respect to step 306 of FIG. 3 may also be performed at step 406 in various embodiments.

At step 408, in some embodiments, a position on touch sensor 10 may be determined corresponding to where object 20 is located. For example, timing information related to when drive signals were sent to touch sensor 10 may be correlated with the signals received at step 404 to determine the position. Object 20 may analyze the reflections on the driven lines of the x-axis of touch sensor 10 caused by their transmission through media of certain components of FIG. 1. Characteristics of these reflections result in determining which of the lines of the x-axis have been affected by the presence of object 20. The timing characteristics can allow for the determination of the position along the y-axis of touch sensor 10. In some embodiments, object 20 is configured to detect a three-dimensional position at step 408. For example, object 20 can determine two-dimensional coordinates corresponding to a surface of touch sensor 10 and it can determine a distance between object 20 and touch sensor 10. Object 20 may be configured to analyze timing parameters determined at step 406 to assist in determining the distance between object 20 and touch sensor 10. For example, object 20 can compare delays associated with signals received from various driven electrode lines of touch sensor 10 (such as the amount of time it takes for each of the signals to reach object 20 from the respective driven electrode lines of touch sensor 10). This comparison may be used in three-dimensional trilateration calculations and/or other suitable calculations to determine the distance between object 20 and touch sensor 10. After step 408 is performed, the method may end or repeat.

In some embodiments, the techniques discussed above with respect to FIGS. 1-4 may provide one or more advantages. For example, these techniques may enable a system to detect a two-dimensional or three-dimensional position while having electrodes only aligned along one axis. As another example, these techniques can facilitate the use of a reactive stylus with a touch screen. Another example advantage is the ability to overcome certain problems when components have defects from manufacturing or use (e.g., short-circuits or open circuits).

Herein, reference to a computer-readable non-transitory storage medium encompasses, where appropriate, one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards, SECURE DIGITAL drives, other suitable computer-readable non-transitory storage media, or a suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, ranges of values, or steps, any of these embodiments may include any combination or permutation of any of the components, elements, functions, operations, ranges of values, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
a controller coupled to a first set of electrodes, the first set of electrodes substantially arranged along a first axis;
wherein the controller is configured to:
send, while the controller has a first impedance, a first set of signals through a transmission medium to the first set of electrodes, an impedance of the transmission medium different than an impedance of the first set of electrodes;
receive a second set of signals, the second set of signals comprising characteristics of the first set of signals resulting from effects on the first set of signals due to the difference in impedance between the first set of electrodes and the transmission medium; and
change, in response to analyzing the second set of signals, the impedance of the controller from the first impedance to a second impedance, the second impedance determined based at least on the second set of signals.

2. The system of claim 1, wherein:
the first impedance of the controller is a linear impedance; and
the second impedance of the controller is a non-linear impedance.

3. The system of claim 1, wherein the controller is further configured to:
send a third set of signals through the transmission medium to the first set of electrodes;
receive a fourth set of signals, the fourth set of signals comprising characteristics resulting from effects on the third set of signals from the first set of electrodes and the transmission medium;
determine timing parameters associated with the first set of signals and the second set of signals;
determine a position of an object associated with the first set of electrodes in response to analyzing the third set of signals, the fourth set of signals, and the timing parameters.

4. The system of claim 3, wherein the position of the object comprises a two-dimensional position.

5. The system of claim 4, wherein:
the controller is further configured to receive a fifth set of signals associated with a second set of electrodes, the second set of electrodes substantially arranged along a second axis, the second axis different than the first axis, the third set of signals resulting at least in part from the third set of signals; and
the controller is configured to detect the position of the object in response to analyzing the third set of signals, the fourth set of signals, the fifth set of signals, the characteristics, and the timing parameters.

6. The system of claim 1, wherein:
the first set of electrodes are arranged to form a plurality of lines extending along the first axis and spaced apart along a second axis, the second axis different than the first axis; and
the controller is configured to send the first set of signals through the transmission medium to the first set of electrodes by sending signals to more than one of the plurality of lines at substantially the same time.

7. The system of claim 1, wherein the controller is configured to send a third set of signals through the transmission medium to the first set of electrodes; and further comprising a stylus, the stylus configured to:
communicate with the controller;
detect a fourth set of signals, the fourth set of signals comprising characteristics resulting from effects of the third set of signals on the first set of electrodes and the transmission medium; and
determine a position associated with the first set of electrodes using the fourth set of signals.

8. A system comprising:
a first line of electrodes arranged along a first axis;
a first track coupled to the first line of electrodes and electrically coupled to a controller, the impedance of the first track less than the impedance of the first line of electrodes;
a second line of electrodes arranged along the first axis and spaced apart from the first line of electrodes along a second axis;
a second track coupled to the second line of electrodes and electrically coupled to the controller, the impedance of the second track less than the impedance of the second line of electrodes, the ratio of impedances of the second track to the second line of electrodes being substantially equal to the ratio of impedances of first track to the first line of electrodes;
a third line of electrodes arranged along the first axis and spaced apart from the second line of electrodes along the second axis; and
a third track coupled to the third line of electrodes and electrically coupled to the controller, the impedance of the third track less than the impedance of the third line of electrodes, the ratio of impedances of the second track to the second line of electrodes being substantially equal to the ratio of impedances of the third track to the third line of electrodes.

9. The system of claim 8, further comprising:
a plurality of lines of electrodes substantially arranged along the second axis and spaced apart in the first axis;

a set of tracks coupled to the plurality of lines of electrodes, the set of tracks comprising a plurality of tracks having substantially different lengths, the set of tracks not comprising the first track, the second track, and the third track; and wherein the first track, the second track, and the third track have substantially the same lengths.

10. The system of claim 8, wherein the controller is configured to:
send a first set of signals through the first, second, and third tracks to the first, second, and third lines of electrodes;
receive a second set of signals, the second set of signals comprising characteristics resulting from effects on the first set of signals from the first, second, and third tracks and the first, second, and third lines of electrodes; and
change, in response to analyzing the second set of signals, one or more of the following: an impedance of the controller and a voltage associated with the controller.

11. The system of claim 8, further comprising a first group of electrodes and a second group of electrodes, the first group of electrodes arranged to receive substantially more charge from a first signal than the second group of electrodes while an object is not present in the vicinity of the first group of electrodes and a second group of electrodes, the first signal sent to the first group of electrodes and the second group of electrodes.

12. The system of claim 8, further comprising a stylus configured to:
communicate with the controller; and
determine a position associated with the first, second, and third lines of electrodes.

13. The system of claim 8, wherein the ratio of the impedance of the first line of electrodes to the impedance of the first track is greater than 1.5.

14. The system of claim 8, further comprising:
a fourth line of electrodes arranged along the first axis and spaced apart from the second line of electrodes along the second axis; and
a fourth track coupled to the fourth line of electrodes and electrically coupled to the controller, the impedance of the fourth track less than the impedance of the fourth line of electrodes, the ratio of the impedance of the third track to the impedance of the third line of electrodes being substantially different than the ratio of the impedance of the fourth track to the impedance of the fourth line of electrodes.

15. A method comprising:
sending, by a controller coupled to a first set of electrodes and having a first impedance, a first set of signals through a transmission medium to the first set of electrodes, the first set of electrodes substantially arranged along a first axis, an impedance of the transmission medium different than an impedance of the first set of electrodes;

receiving, by the controller, a second set of signals, the second set of signals comprising characteristics of the first set of signals resulting from effects on the first set of signals due to the difference in impedance between the first set of electrodes and the transmission medium;

changing, by the controller and in response to analyzing the second set of signals, the impedance of the controller from the first impedance to a second impedance, the second impedance determined based at least on the second set of signals.

16. The method of claim 15, wherein:
the first impedance of the controller is a linear impedance; and
the second impedance of the controller is a non-linear impedance.

17. The method of claim 15, further comprising:
sending, by the controller, a third set of signals through the transmission medium to the first set of electrodes;
receiving, by the controller, a fourth set of signals, the fourth set of signals comprising characteristics resulting from effects on the third set of signals from the first set of electrodes and the transmission medium;
determining, by the controller, timing parameters associated with the first set of signals and the second set of signals;
determining, by the controller, a position of an object associated with the first set of electrodes in response to analyzing the third set of signals, the fourth set of signals, and the timing parameters.

18. The method of claim 17, wherein the position of the object comprises a two-dimensional position.

19. The method of claim 18, further comprising:
receiving, at the controller, a fifth set of signals associated with a second set of electrodes, the second set of electrodes substantially arranged along a second axis, the second axis different than the first axis, the fifth set of signals resulting at least in part from the third set of signals; and
wherein detecting the position of the object comprises detecting the position of the object in response to analyzing the third set of signals, the fourth set of signals, the fifth set of signals, the characteristics, and the timing parameters.

20. The method of claim 15, further comprising:
sending, by the controller, a third set of signals through the transmission medium to the first set of electrodes;
communicate, by a stylus, with the controller;
detecting, by the stylus, a fourth set of signals, the fourth set of signals comprising characteristics resulting from effects of the third set of signals on the first set of electrodes and the transmission medium; and
determining, by the stylus, a position associated with the first set of electrodes using the fourth set of signals.

* * * * *